United States Patent
Nishimura

(10) Patent No.: US 11,821,745 B2
(45) Date of Patent: Nov. 21, 2023

(54) TRAVELING ROUTE DETERMINATION SYSTEM, TRAVELING ROUTE DETERMINATION METHOD, AND COMPUTER PROGRAM

(71) Applicant: SUMITOMO ELECTRIC INDUSTRIES, LTD., Osaka (JP)

(72) Inventor: Shigeki Nishimura, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 307 days.

(21) Appl. No.: 17/286,049

(22) PCT Filed: Dec. 2, 2019

(86) PCT No.: PCT/JP2019/046980
§ 371 (c)(1),
(2) Date: Apr. 16, 2021

(87) PCT Pub. No.: WO2020/129588
PCT Pub. Date: Jun. 25, 2020

(65) Prior Publication Data
US 2021/0381842 A1    Dec. 9, 2021

(30) Foreign Application Priority Data
Dec. 17, 2018    (JP) .................................. 2018-235543

(51) Int. Cl.
*G01C 21/34*    (2006.01)
*G01C 21/36*    (2006.01)

(52) U.S. Cl.
CPC ..... *G01C 21/3492* (2013.01); *G01C 21/3602* (2013.01)

(58) Field of Classification Search
CPC .. G01C 21/3492; G01C 21/3602; G08G 1/00; G08G 1/09
See application file for complete search history.

(56) References Cited

U.S. PATENT DOCUMENTS

2010/0114466 A1*   5/2010   Tomita ............... G01C 21/3461
                                                                        701/532
2019/0316920 A1   10/2019   Miyagawa et al.

FOREIGN PATENT DOCUMENTS

| JP | 2013-156835 A | 8/2013 |
| JP | 2018-096810 A | 6/2018 |
| JP | 2018-156436 A | 10/2018 |

OTHER PUBLICATIONS

"Fiedler, et. al., 'Impact of Mobility-on-Demand on Traffic Congestion', Aug. 8, 2017, pp. 1-6" (Year: 2017).*
Machine Translation of JP2018156436A (Year: 2018).*
Machine Translation of JP2013156835A (Year: 2013).*

* cited by examiner

*Primary Examiner* — Faris S Almatrahi
*Assistant Examiner* — Sahar Motazedi
(74) *Attorney, Agent, or Firm* — Oliff PLC

(57) ABSTRACT

A traveling route determination system of this disclosure includes a processor configured to operate so as to determine, by using a second route cost different from a first route cost that is used for determining a first traveling route for a first automated driving vehicle allocated with a demand of an on-demand mobility service, a second traveling route for a second automated driving vehicle not allocated with the demand.

10 Claims, 5 Drawing Sheets

TRAVELING ROUTE DETERMINATION SYSTEM, TRAVELING ROUTE DETERMINATION METHOD, AND COMPUTER PROGRAM

TECHNICAL FIELD

The present disclosure relates to a traveling route determination system, a traveling route determination method, and a computer program. This application claims priority on Japanese Patent Application No. 2018-235543 filed on Dec. 17, 2018, the entire content of which is incorporated herein by reference.

BACKGROUND ART

PATENT LITERATURE 1 discloses a route search system.

CITATION LIST

Patent Literature

PATENT LITERATURE 1: Japanese Laid-Open Patent Publication No. 2018-096810

SUMMARY OF INVENTION

An aspect of the present disclosure is a traveling route determination system. In an embodiment, the traveling route determination system includes: a processor configured to operate so as to determine, by using a second route cost different from a first route cost that is used for determining a first traveling route for a first automated driving vehicle allocated with a demand of an on-demand mobility service, a second traveling route for a second automated driving vehicle not allocated with the demand.

A traveling route determination system from a different point of view includes: a reception unit configured to operate so as to receive a demand of an on-demand mobility service; a processor configured to operate so as to determine, for a first automated driving vehicle allocated with the demand, a first traveling route up to a first destination according to the demand on the basis of a first route cost, the processor being configured to operate so as to determine, for a second automated driving vehicle not allocated with the demand, a second traveling route up to a second destination for the second automated driving vehicle on the basis of a second route cost different from the first route cost; and a transmission unit configured to operate so as to transmit a first traveling route to the first automated driving vehicle, and so as to transmit the second traveling route to the second automated driving vehicle.

Another aspect of the present disclosure is a traveling route determination method. In an embodiment, the traveling route determination method includes: determining, by using a second route cost different from a first route cost that is used for determining a first traveling route for a first automated driving vehicle allocated with a demand of an on-demand mobility service, a second traveling route for a second automated driving vehicle not allocated with the demand.

Another aspect of the present disclosure is a computer program. In an embodiment, the computer program causes a computer to execute an operation of determining, by using a second route cost different from a first route cost that is used for determining a first traveling route for a first automated driving vehicle allocated with a demand of an on-demand mobility service, a second traveling route for a second automated driving vehicle not allocated with the demand.

DESCRIPTION OF EMBODIMENTS

Figure 1:
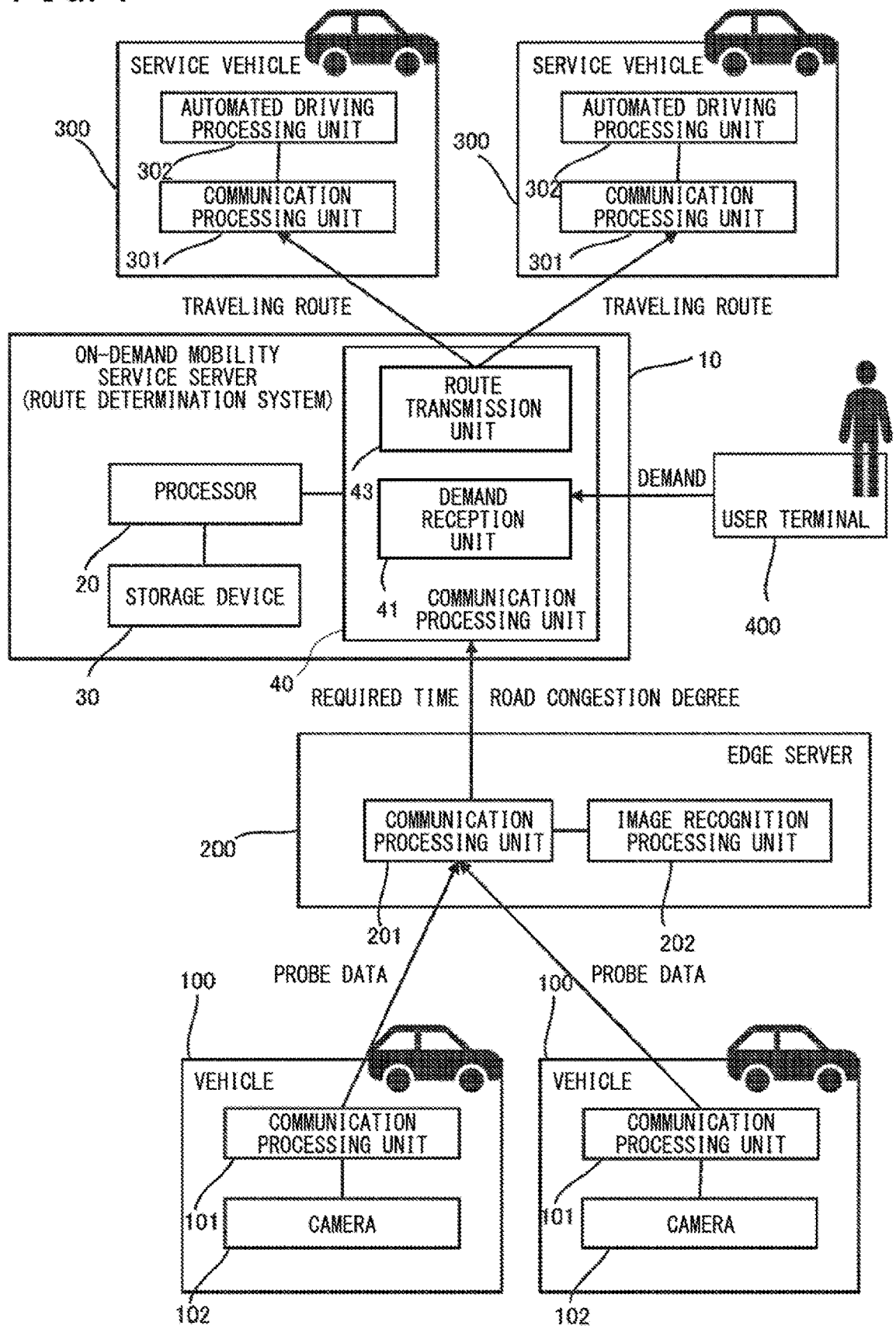
FIG. 1 is a configuration diagram of a traveling route determination system and peripheral configurations.

Problems to be Solved by the Present Disclosure

In recent years, studies for realizing practical use of an on-demand mobility service by automated driving vehicles have been conducted. The on-demand mobility service by automated driving vehicles is a service in which a user is transported to a destination by an automated driving vehicle. In the on-demand mobility service by automated driving vehicles, after an automated driving vehicle has transported a user to a destination, the automated driving vehicle is not immediately allocated with a demand for a next service in some cases. In such a case, it is necessary to cause the automated driving vehicle to travel in a not-in-service state without a passenger, to a destination (not-in-service-vehicle destination) which is a specific place, such as a service station or an area having a high probability of occurrence of a demand.

In association with prevalence of on-demand mobility services, it is expected that automated driving vehicles for on-demand mobility services will increase. As a result, automated driving vehicles that travel in a not-in-service state will also increase. When many automated driving vehicles simultaneously head for a specific not-in-service-vehicle destination, automated driving vehicles are concentrated on a road leading to the not-in-service-vehicle destination, thereby causing congestion of the road. In particular, in a case where a road leading to the not-in-service-vehicle destination is congested, when many vehicles that travel in a not-in-service state are concentrated on the road, the congestion is increased, and the required time for passing through the road may be increased. When the required time is increased, a service by an automated driving vehicle allocated with a demand will be adversely influenced. In addition, when the required time is increased, traveling in a not-in-service state of the vehicle is not performed within a scheduled time period, and the provision of the service thereafter may be adversely influenced.

Therefore, it is desired to suppress aggravation of the congestion degree caused by automated driving vehicles not allocated with demands.

Effects of the Present Disclosure

According to the present disclosure, aggravation of the congestion degree caused by second automated driving vehicles not allocated with demands can be suppressed.

DESCRIPTION OF EMBODIMENT OF THE PRESENT DISCLOSURE (1) A traveling route determination system according to an embodiment includes: a processor configured to operate so as to determine, by using a second route cost different from a first route cost that is used for determining a first traveling route for a first automated driving vehicle allocated with a demand of an on-demand mobility service, a second traveling route for a second automated driving vehicle not allocated with the demand. The route cost to be used in determination of the traveling route is different between the second automated driving vehicle not allocated with the demand and the first automated driving vehicle allocated with the demand. Therefore, overlapping between the second traveling route for the second automated driving vehicle and the first traveling route for the first automated driving vehicle is easily avoided. As a result, aggravation of the congestion degree due to the second automated driving vehicle can be suppressed.

(2) Preferably, the second route cost is determined such that a difference between the second route cost and the first route cost is increased in accordance with an increase in a congestion degree of a road. In this case, the larger congestion degree a road has, the higher the cost becomes, and thus, the road is less likely to be selected as a second traveling route. As a result, further aggravation of the congestion degree of the road having a large congestion degree can be suppressed.

(3) Preferably, the second route cost is calculated by multiplying the first route cost by a coefficient corresponding to a congestion degree of a road. In this case, the second route cost can be easily determined.

(4) The second traveling route may be a traveling route up to a destination for the second automated driving vehicle not allocated with the demand. A destination for a second automated driving vehicle not allocated with a demand is more likely to be a common destination for many second automated driving vehicles. As a result, many second automated driving vehicles travel toward the common destination, and thus, concentration of vehicles may occur. However, since the second traveling route is more likely to be prevented from overlapping the first traveling route, aggravation of the congestion degree of the route to be traveled by the first automated driving vehicle can be suppressed.

(5) Preferably, the destination is a destination set in advance for the second automated driving vehicle not allocated with the demand, or a destination determined by the processor for the second automated driving vehicle not allocated with the demand.

(6) A traveling route determination system according to the embodiment may include: a reception unit configured to operate so as to receive a demand of an on-demand mobility service; a processor configured to operate so as to determine, for a first automated driving vehicle allocated with the demand, a first traveling route up to a first destination according to the demand on the basis of a first route cost, the processor being configured to operate so as to determine, for a second automated driving vehicle not allocated with the demand, a second traveling route up to a second destination for the second automated driving vehicle on the basis of a second route cost different from the first route cost; and a transmission unit configured to operate so as to transmit a first traveling route to the first automated driving vehicle, and so as to transmit the second traveling route to the second automated driving vehicle.

(7) A traveling route determination method according to the embodiment includes determining, by using a second route cost different from a first route cost that is used for determining a first traveling route for a first automated driving vehicle allocated with a demand of an on-demand mobility service, a second traveling route for a second automated driving vehicle not allocated with the demand.

(8) A computer program according to the embodiment is for causing a computer to execute an operation of determining, by using a second route cost different from a first route cost that is used for determining a first traveling route for a first automated driving vehicle allocated with a demand of an on-demand mobility service, a second traveling route for a second automated driving vehicle not allocated with the demand. The computer program is stored in a computer-readable non-transitory storage medium, for example. The computer program stored in the storage medium is read by a processor. The processor executes commands included in the computer program.

DETAILS OF EMBODIMENT

FIG. 1 shows a route determination system 10 and peripheral configurations thereof according to an embodiment. The route determination system 10 of the embodiment is configured as an on-demand mobility service server. In an on-demand mobility service, a service vehicle 300 is dispatched to a boarding place of a user in accordance with a service demand from the user. The user having gotten on the service vehicle 300 is transported by the service vehicle 300 to the desired destination. The service vehicle 300 of the embodiment is an automated driving vehicle. The automated driving vehicle may be an unmanned vehicle in which a driver is not on board, or may be a vehicle in which a driver is on board in case for emergency or the like but that travels by automated driving. The automated driving herein refers to a state in which no person is involved in determination of a traveling route and in which the vehicle 300 autonomously travels along a traveling route determined by the route determination system 10. However, involvement of a person in driving at a time of emergency or the like is not excluded.

The route determination system 10 of the embodiment is configured by a computer. In order to provide the on-demand mobility service, the route determination system 10 has a network connection with service vehicles 300 and a user terminal 400. The computer forming the route determination system 10 also includes a communication processing unit 40 for establishing the network connection and for performing communication with the outside. For example, the communication processing unit 40 processes communication with the user terminal 400. The communication processing unit 40 functions as a reception unit 41 which receives a service demand from the user terminal 400. The communication processing unit 40 processes communication with service vehicles 300. The communication processing unit 40 functions as a transmission unit 43 which transmits, to each service vehicle 300, a route for traveling by automated driving.

Figure 2:
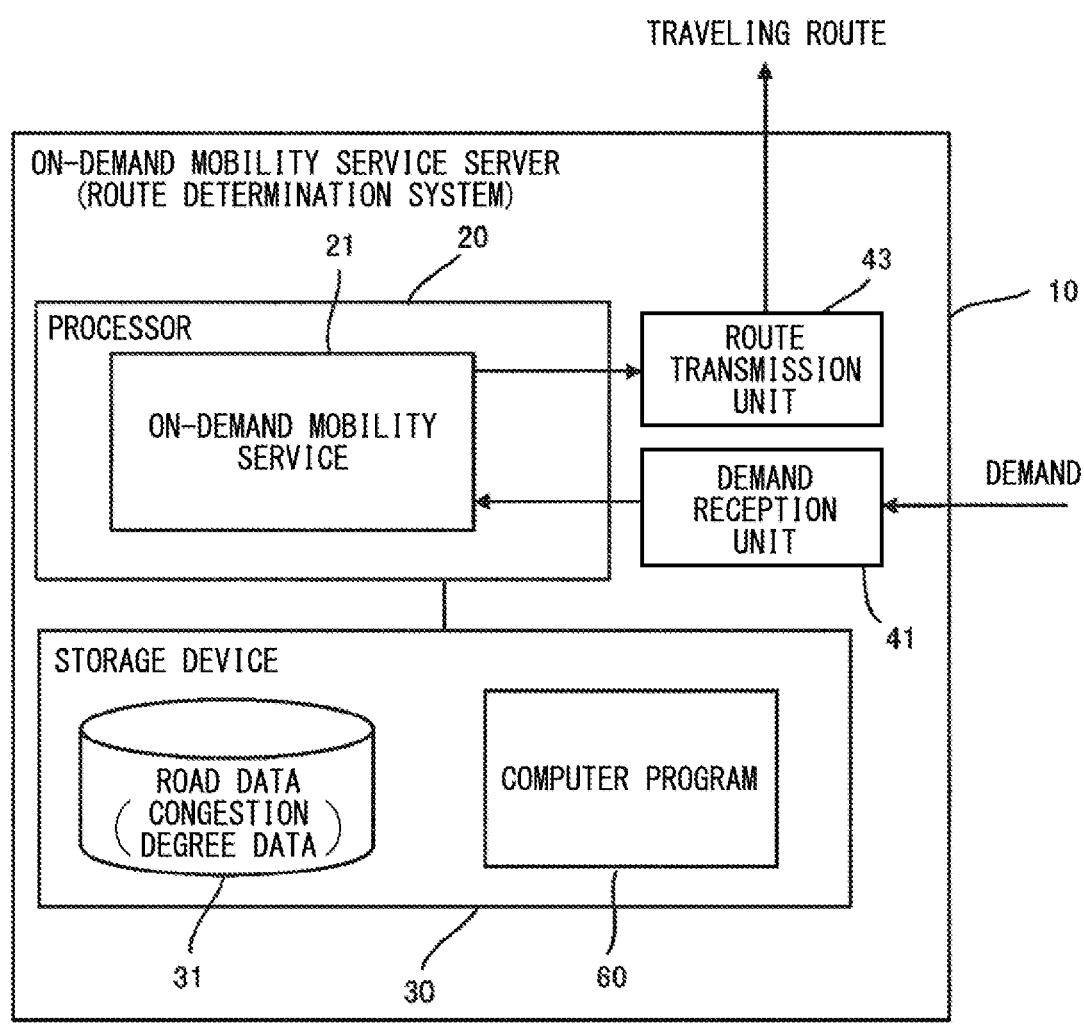
FIG. 2 is a configuration diagram of the traveling route determination system.

As shown in FIG. 2, the computer forming the route determination system 10 includes a processor 20 and a storage device 30. The processor 20 is connected to the storage device 30. The storage device 30 has stored therein a computer program 60 which causes the computer to function as the route determination system (on-demand mobility service server). The processor 20 reads out and executes the computer program 60 stored in the storage device 30. The computer program 60 includes commands for causing the processor 20 to perform operations for an on-demand mobility service 21.

Figure 3:
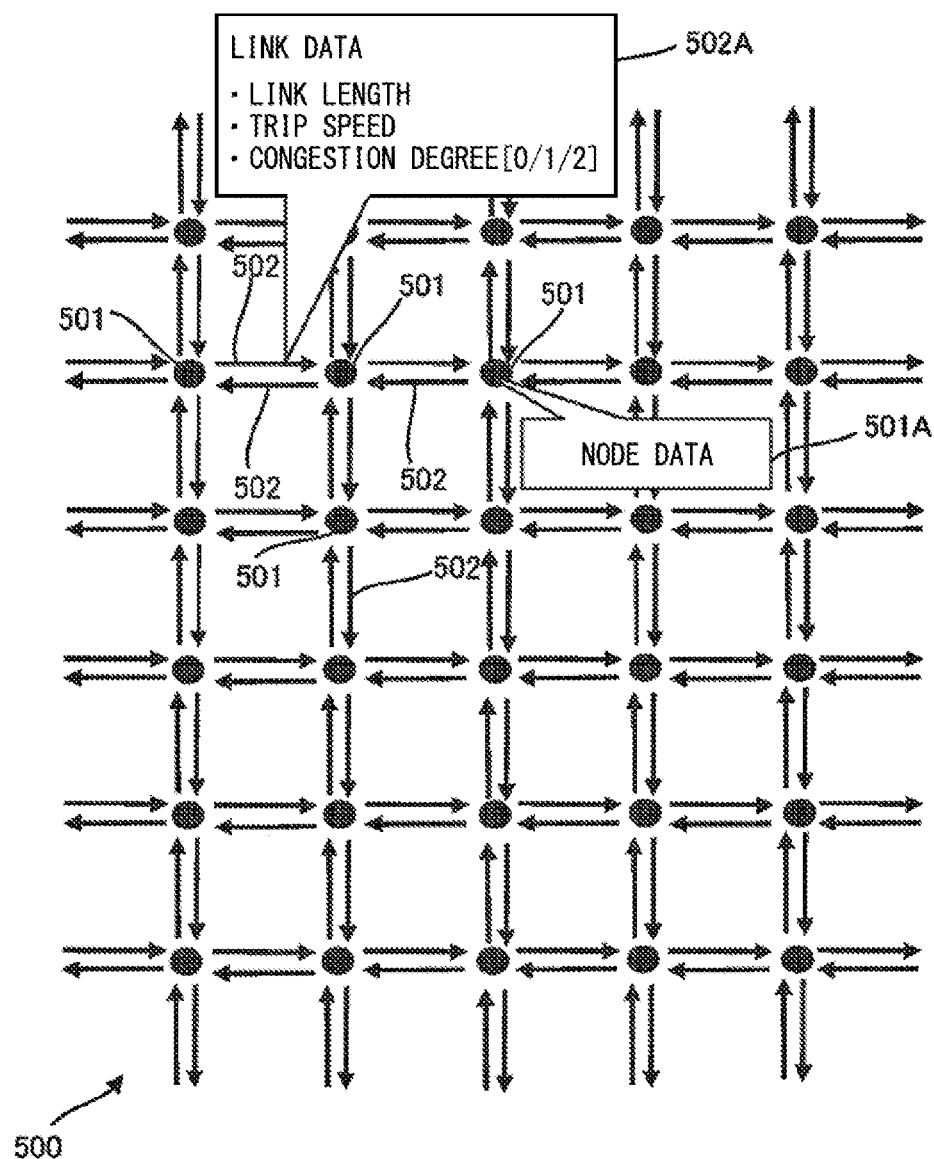
FIG. 3 illustrates a road network.

The storage device 30 has road data 31 stored therein. As shown in FIG. 3, the road data 31 is data in which a road network 500 is represented as a combination of nodes 501 and links 502. Each node 501 is an intersection or another nodal point on a road. In the road data 31, each node 501 is represented by node data 501A. The node data 501A includes data of a node number, each link flowing out from the node, position coordinates of the node, and the like. Each link 502 is a road section between a node 501 and another node 501. In the road data 31, each link 502 is represented by link data 502A. In the embodiment, the link data 502A includes data indicating a node at the link endpoint, required time, and a congestion degree. The required time indicates a time period required for traveling the link. For example, the required time is obtained as probe data from each vehicle 100 traveling the link 502. The congestion degree indicates a congestion status of vehicles in the link 502. For example, the congestion degree is calculated on the basis of the probe data obtained from the vehicle 100 traveling in the link 502. Since the node data 501A indicates each link flowing out from the node and the link data 502A indicates the node at the link endpoint, it is possible, in the route search, to trace from a link to a node, and from a node to a link, and thus, route search is easy. The vehicle 100 that transmits probe data may be a service vehicle 300 or may be a vehicle other than a service vehicle.

In the embodiment, as an example, the congestion degree is determined by an edge server 200 on the basis of a road image captured by a camera 102 mounted on each vehicle 100, and the traveling speed of the vehicle 100.

In each vehicle 100 traveling on a road, a communication processing unit 101 transmits probe data to the edge server 200. The vehicle 100 and the edge server 200 are connected to each other via a network. The probe data of the embodiment includes a traveling speed and a road image captured by the camera 102.

When the edge server 200 has received probe data via a communication processing unit 201, the edge server 200 determines a congestion degree on the basis of the probe data. In the edge server 200, a road image recognition processing unit 202 recognizes vehicles in the road image, and calculates the number of vehicles present in the road image. The congestion degree is determined on the basis of the number of vehicles and the traveling speed. For example, when the number of vehicles is large and the traveling speed is slow, the congestion degree is determined to be high, and when the number of vehicles is small and the traveling speed is fast, the congestion degree is determined to be low. The congestion degree may be determined only on the basis of the number of vehicles, or may be determined only on the basis of the traveling speed.

In the embodiment, as an example, the congestion degree is expressed in three ranks of 0, 1, and 2. A congestion degree 0 indicates a status in which the number of traveling vehicles is small and the traveling speed has not been decreased. A congestion degree 1 indicates a status in which the number of traveling vehicle is large but the traveling speed has not been decreased. A congestion degree 2 indicates a status in which the number of traveling vehicle is large and the traveling speed has been decreased.

The edge server 200 transmits the required time and the congestion degree of each link to the route determination system (service server) 10. The edge server 200 and the route determination system 10 are connected to each other via a network. The route determination system 10 stores, as link data 502A into the storage device 30, the required time and the congestion degree of each link received from the edge server 200. The link data 502A is used in traveling route search for a service vehicle 300, as described later.

Figure 4:
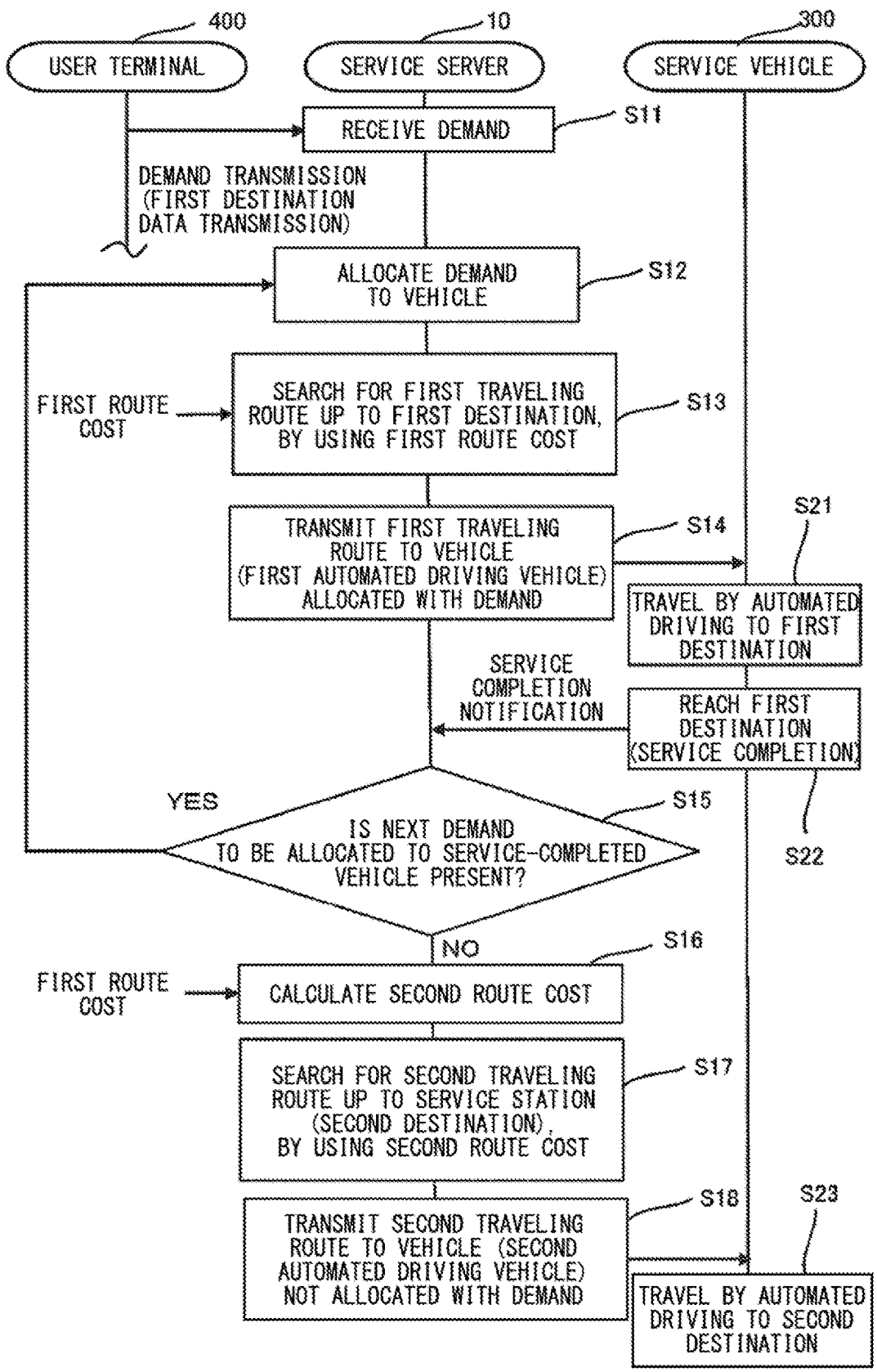
FIG. 4 is a flow chart showing operations for an on-demand mobility service.

FIG. 4 shows an operation procedure of the route determination system (service server) 10 for the on-demand mobility service 21. First, the route determination system 10 receives, by means of the demand reception unit 41, a service demand (service use request; vehicle dispatch request) from a user terminal 400 of a user who is to use the service (step S11). The demand includes data (first destination data) indicating a destination (first destination) of the user, in addition to data of the boarding position desired by the user. Upon receiving the demand, the route determination system 10 determines a service vehicle 300 to be allocated with the demand, out of service vehicles 300 present in the vicinity of the boarding position of the user (step S12). The vehicle to be allocated with the demand is determined, for example, with reference to the required time from the current position of the vehicle to the boarding position of the user. Here, the service vehicle 300 allocated with the demand is referred to as a "first automated driving vehicle".

The route determination system 10 searches for a first traveling route for the first automated driving vehicle 300 allocated with the demand (step S13). The first traveling route to be searched for is a route from the current position of the first automated driving vehicle 300, via the boarding position of the user, to the destination (first destination) of the user.

The first traveling route is determined by an algorithm that searches for a route that minimizes the cost of the travel by the vehicle 300 to the destination. This algorithm is executed by the processor 20 of the route determination system 10. The cost here is the required time, for example. That is, the first traveling route is searched for such that the required time to the destination (first destination) of the user becomes shortest. The required time to the destination is calculated by using the required time included in the link data 502A of each link 502 in the road network 500. The required time included in the link data 502A indicates the trip time of each link according to the current traffic status. Therefore, an appropriate first traveling route can be determined after the required time to the destination has been accurately estimated. Here, the required time of each link included in the link data 502A is referred to as a "first route cost". In the embodiment, the first traveling route is determined by using the first route cost.

The route determination system 10 transmits instruction data including the first traveling route, from the route transmission unit 43 to the first automated driving vehicle 300 allocated with the demand (step S14). The instruction data that is transmitted includes a user ID, the boarding position of the user, a destination, and the like, in addition to the first traveling route.

In the first automated driving vehicle 300, when a communication processing unit 301 (see FIG. 1) has received the instruction data including the first traveling route, an automated driving processing unit 302 (see FIG. 1) causes the first automated driving vehicle 300 to travel by automated driving along the first traveling route (step S21). As a result, an on-demand mobility service is provided to the user.

When the user has gotten off the first automated driving vehicle 300 at the destination and the first automated driving vehicle 300 has completed provision of the service to the user, the first automated driving vehicle 300 transmits a service completion notification to the route determination system 10 (step S22).

Upon receiving the service completion notification, the route determination system 10 determines whether or not there is a new demand that can be allocated to the vehicle (service-completed vehicle) 300 that has transmitted the service completion notification. The demand that can be allocated to the vehicle 300 is, for example, a demand for which the vehicle 300 can reach the boarding position of the user within a predetermined time period (e.g., 5 minutes) from the current position of the vehicle 300. When such a demand is present (YES in step S15), demand allocation is similarly performed in step S12 and operations similar to those in step S13 and step S14 are performed in the route determination system 10.

When the demand as described above is not present (NO in step S15), the route determination system 10 causes the vehicle 300 to travel with no demand allocated thereto. Here, the service vehicle 300 not allocated with a demand is referred to as a "second automated driving vehicle". The route determination system 10 searches for a second traveling route for the second automated driving vehicle 300 (step S17). The second traveling route to be searched for is a route for reaching from the current position of the second automated driving vehicle 300 to the destination (second destination) for the second automated driving vehicle 300.

Here, as an example, the second destination is a service station where the service vehicle 300 is to stand by. In this case, the second traveling route is a route for the second automated driving vehicle 300 to travel in a not-in-service state to the service station. The position of the service station is set in advance in the storage device 30 of the route determination system 10. The route determination system 10 reads out the position of the set service station, as the position of the second destination, and determines a second route up to the service station. The second destination may be a destination set in advance other than the service station. The second destination may be determined by the processor 20 of the route determination system 10. The second destination determined by the processor 20 is, for example, a place having a high probability of occurrence of a demand. The place having a high probability of occurrence of a demand can be determined through calculation based on data of places where demands occurred in the past.

The second traveling route is also determined by a route search algorithm similar to that for the first traveling route. That is, the second traveling route is determined by the route search algorithm that searches for a route that minimizes the cost of the travel by the vehicle 300 to the destination. However, in the search for the second traveling route, a second route cost calculated from the required time is used as the route cost of each link, as described below.

Second route cost of link having congestion degree 0=required time

Second route cost of link having congestion degree 1=1.5×required time

Second route cost of link having congestion degree 2=2.0×required time

As described above, in the case of the congestion degree 0, similar to the first route cost, the required time indicated by the link data 502A is handled as the second route cost. Meanwhile, as in the case of the congestion degree 1 and the congestion degree 2, when the number of vehicles traveling on the road is large, a value obtained by multiplying the required time indicated by the link data 502A by a coefficient corresponding to the congestion degree is handled as the second route cost. The second route cost is calculated such that the larger the congestion degree is, the larger the second route cost is, compared with the first route cost (required time).

The required time indicated by the link data 502A is based on the probe data or the like, and is a required time reflecting the actual traffic status. Therefore, even in the same link, when the link is congested, the required time indicated by the link data 502A becomes long. That is, the required time (first route cost) itself represents the route cost reflecting the congestion degree. However, in the above calculation of the second route cost, the route cost, i.e., the required time reflecting the congestion degree, is further multiplied by a coefficient corresponding to the congestion degree. Accordingly, the cost of a road having a larger congestion degree is more increased. As a result, in the search for the second traveling route for the second automated driving vehicle 300 not allocated with a demand, a route avoiding a road having a large congestion degree is determined. The probe data is travel data obtained from a vehicle having a sensor mounted therein.

Here, when many second automated driving vehicles 300 having completed the services are caused to simultaneously travel in a not-in-service state to a specific service station, the second automated driving vehicles 300 are concentrated on the road leading to the service station, whereby the congestion degree is increased, and thus, an unnecessary traffic jam may occur. When a traffic jam occurs, the service by the first automated driving vehicle 300 allocated with a demand is adversely influenced. However, in the present embodiment, the second traveling route at the time of traveling in a not-in-service state of the second automated driving vehicle 300 that has completed the service is determined so as to avoid a road having a large congestion degree, by using the congestion degree of the road obtained from vehicles traveling on the road.

The route determination system 10 transmits instruction data including the second traveling route from the route transmission unit 43 to the second automated driving vehicle 300 (step S18). The instruction data that is transmitted includes, for example, information of the service station as the second destination, in addition to the second traveling route.

In the second automated driving vehicle 300, when the communication processing unit 301 (see FIG. 1) has received the instruction data including the second traveling route, the automated driving processing unit 302 (see FIG. 1) causes the second automated driving vehicle 300 to travel by automated driving along the second traveling route (step S23). Accordingly, the automated driving vehicle having completed the service can be caused to travel in a not-in-service state to the service station. Since the second traveling route is determined so as to avoid the congested road, aggravation of the congestion degree due to traveling in a not-in-service state of the second automated driving vehicle 300 that has completed the service can be suppressed, and occurrence of an unnecessary traffic jam can be suppressed.

Figure 5:
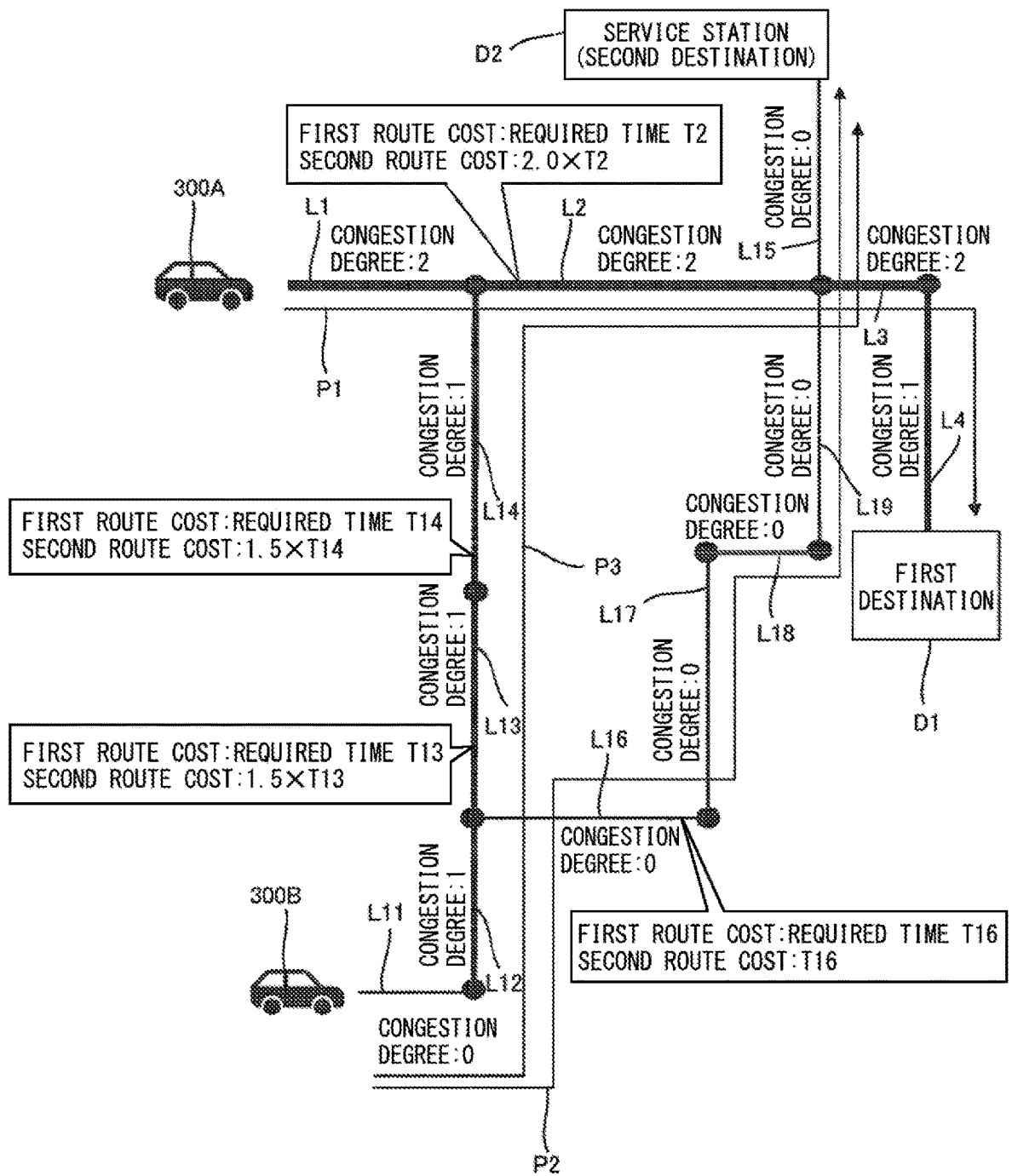
FIG. 5 shows an example of a first traveling route and a second traveling route.

FIG. 5 shows an example of a first traveling route P1 for a first automated driving vehicle 300A allocated with a demand, and a second traveling route P2 for a second automated driving vehicle 300B not allocated with a demand. In FIG. 5, the first automated driving vehicle 300A travels by automated driving along the first traveling route P1 from the current position, via road links L1, L2, L3, and L4, to a first destination D1. The second automated driving vehicle 300B travels by automated driving along the second traveling route P2 from the current position, via road links L11, L12, L16, L17, L18, L19, and L15, to a service station (second destination) D2.

Here, the congestion degrees of the road links L1, L2, and L3 are each 2, the congestion degrees of the road links L4, L12, L13, and L14 are each 1, and the congestion degrees of the road links L11, L15, L16, L17, L18, and L19 are each 0. In terms of the first route cost (required time), it is assumed that the route that has the minimum required time (minimum cost) from the current position of the second automated driving vehicle 300B to the service station D2, is P3. The route P3 extends from the current position of the second automated driving vehicle 300B, via the road links L11, L12, L13, L14, L2, and L15, to the service station D2.

If the second automated driving vehicle 300B takes the route P3, the second automated driving vehicle 300B travels the road links L12, L13, L14, and L2 which have relatively high congestion degrees. As a result, the congestion degrees of these road links L12, L13, L14, and L2 are more increased. In particular, as in the case of the road link L2, a road link near the service station D2 is also highly likely to have many other second automated driving vehicles 300B traveling in a not-in-service state to the service station D2. Accordingly, the congestion degree of the road link L2 that is already congested is further increased, and the required time for traveling the road link L2 is increased. When the required time for traveling the road link L2 is increased, arrival to the destination D1 of the first automated driving vehicle 300A passing through the road link L2 for provision of the service is delayed.

However, in the present embodiment, the second traveling route P2 having a low congestion degree is selected, while the route P3 having large congestion degrees is avoided. Therefore, the congestion degree of the road link L2 and the like is prevented from being increased due to second automated driving vehicles 300B traveling in a not-in-service state.

In the search for the second traveling route P2, the second route cost is used as described above. For example, when the required time (first route cost) of the road link L16 having the congestion degree 0 is T16, the second route cost of the road link L16 is T16. When the required time (first route cost) of the road link L13 having the congestion degree 1 is T13, the second route cost of the road link L13 is 1.5×T13. Similarly, when the required time (first route cost) of the road link L14 having the congestion degree 1 is T14, the second route cost of the road link L14 is 1.5×T14. When the required time (first route cost) of the road link L2 having the congestion degree 2 is T2, the second route cost of the road link L13 is 2.0×T2.

The route determination system 10 performs route search by using the second route cost of each road link in the road network as described above, thereby being able to determine the second traveling route that realizes the minimum cost.

ADDITIONAL NOTE

The disclosed embodiment herein is merely illustrative in all aspects and should not be recognized as being restrictive. The scope of the present disclosure is defined by the scope of the claims rather than by the meaning described above, and is intended to include meaning equivalent to the scope of the claims and all modifications within the scope.

REFERENCE SIGNS LIST 10 route determination system
20 processor
21 on-demand mobility service
30 storage device
31 road data
40 communication processing unit
41 reception unit
43 transmission unit
60 computer program
100 vehicle
101 communication processing unit
102 camera
200 edge server
201 communication processing unit
202 road image recognition processing unit
300 service vehicle
300A first automated driving vehicle
300B second automated driving vehicle
301 communication processing unit
302 automated driving processing unit
400 user terminal
500 road network
501 node
501A node data
502 link
502A link data
D1 first destination
D2 service station (second destination)
L1 road link
L2 road link
L3 road link
L4 road link
L11 road link
L12 road link
L13 road link
L14 road link
L15 road link
L16 road link
L17 road link
L18 road link
L19 road link
P1 first traveling route
P2 second traveling route
P3 route

The invention claimed is:

1. A traveling route determination system configured to determine traveling routes for first and second automated driving vehicles in accordance with a request for an on-demand mobility service, the first automated driving vehicle being currently requested, the second automated vehicle not being currently requested, the traveling route determination system comprising:
   a storage device configured to store, for each link of a plurality of links of each of the traveling routes, a current route cost corresponding to a current traffic status; and
   a processor configured to:
      in response to determining that the first automated driving vehicle is being currently requested, determine a first traveling route for the first automated driving vehicle by using a first route cost for a first link of the plurality of links on which the first and second automated driving vehicles are able to travel,
      in response to determining that the second automated driving vehicle is not being currently requested, determine a second traveling route for the second automated driving vehicle by using a second route cost for the first link, and transmit instruction data including the second traveling route to the second automated driving vehicle, wherein the second automated driving vehicle travels based on the second traveling route, wherein for the first route cost, the current route cost corresponding to the current traffic status is applied as is, for the second route cost, an additional cost is added to the current route cost.

2. The traveling route determination system according to claim 1, wherein the second route cost is determined such that a difference between the second route cost and the first route cost is increased in accordance with an increase in a congestion degree of the first link.

3. The traveling route determination system according to claim 1, wherein the second route cost is calculated by multiplying the first route cost by a coefficient corresponding to a congestion degree of the first link.

4. The traveling route determination system according to claim 1, wherein the second traveling route is a traveling route up to a destination for the second automated driving vehicle.

5. The traveling route determination system according to claim 4, wherein the destination for the second automated driving vehicle is set in advance, or determined by the processor.

6. The traveling route determination system according to claim 1, wherein the current route cost corresponding to the current traffic status is calculated on the basis of probe data obtained from the first automated driving vehicle, the second automated driving vehicle, and/or another automated driving vehicle traveling the first link, and a congestion degree of the first link is determined on the basis of the probe data.

7. The traveling route determination system according to claim 6, wherein the probe data includes a road image captured by a camera of the first automated driving vehicle, the second automated driving vehicle, and/or the other automated driving vehicle and a traveling speed of the first automated driving vehicle, the second automated driving vehicle, and/or the other automated driving vehicle, and the congestion degree of the first link is determined on the basis of at least one of a number of vehicles included in the road image and the traveling speed.

8. A traveling route determination system configured to determine traveling routes for first and second automated driving vehicles in accordance with a request for an on-demand mobility service, the first automated driving vehicle being currently requested, the second automated vehicle not being currently requested, the traveling route determination system comprising:

a storage device configured to store, for each link of a plurality of links of the traveling routes, a current route cost corresponding to a current traffic status;

a reception unit configured to operate so as to receive the request for the on-demand mobility service;

a processor configured to:

in response to determining that the first automated driving vehicle is currently requested, determine a first traveling route up to a first destination for the first automated driving vehicle by using a first route cost for a first link of the plurality of links on which the first and second automated driving vehicles are able to travel, and in response to determining that the second automated driving vehicle is not being currently requested, determine a second traveling route up to a second destination for the second automated driving vehicle by using a second route cost for the first link; and a transmission unit configured to operate so as to transmit instruction data including the second traveling route to the second automated driving vehicle, wherein the second automated driving vehicle travels based on the second traveling route, wherein for the first route cost, the current route cost corresponding to the current traffic status is applied as is, for the second route cost, an additional cost is added to the current route cost.

9. A traveling route determination method for determining traveling routes for first and second automated driving vehicles in accordance with a request for an on-demand mobility service, the first automated driving vehicle being currently requested, the second automated vehicle not being currently requested, the traveling route determination method comprising:

a step of determining, in response to determining that the first automated driving vehicle is being currently requested, a first traveling route for the first automated driving vehicle by using a first route cost for a first link of a plurality of links of the traveling routes on which the first and second automated driving vehicles are able to travel;

a step of determining, in response to determining that the second automated driving vehicle is not being currently requested, a second traveling route for the second automated driving vehicle by using a second route cost for the first link; and a step of transmitting instruction data including the second traveling route to the second automated driving vehicle, wherein the second automated driving vehicle travels based on the second traveling route, wherein for the first route cost, a current route cost corresponding to a current traffic status is applied as is, for the second route cost, an additional cost is added to the current route cost.

10. A non-transitory computer readable storage medium storing a computer program for causing a computer to operate as a system configured to determine traveling routes for first and second automated driving vehicles in accordance with a request for an on-demand mobility service, the first automated driving vehicle being currently requested, the second automated vehicle not being currently requested, the computer program causing the computer to execute:

a step of determining, in response to determining that the first automated driving vehicle is being currently requested, a first traveling route for the first automated driving vehicle by using a first route cost for a first link of a plurality of links of the traveling routes on which the first and second automated driving vehicles are able to travel;

a step of determining, in response to determining that the second automated driving vehicle is not being currently requested, a second traveling route for the second automated driving vehicle by using a second route cost for the first link; and a step of transmitting instruction data including the second traveling route to the second automated driving vehicle, wherein the second automated driving vehicle travels based on the second traveling route, wherein for the first route cost, a current route cost corresponding to a current traffic status is applied as is, for the second route cost, an additional cost is added to the current route cost.

\* \* \* \* \*